United States Patent [19]
Sutton, Jr.
[11] Patent Number: 4,602,739
[45] Date of Patent: Jul. 29, 1986

[54] VENTILATION CONTROL APPARATUS FOR ANIMAL ENCLOSURE AND METHOD

[76] Inventor: James A. Sutton, Jr., 816 Henkel Rd., Statesville, N.C. 28677

[21] Appl. No.: 673,595

[22] Filed: Nov. 21, 1984

[51] Int. Cl.$^4$ .............................................. G05D 23/13

[52] U.S. Cl. .................................... 236/46 F; 165/16; 236/49

[58] Field of Search .................... 236/46 F, 49; 165/16

[56] References Cited

U.S. PATENT DOCUMENTS

| | | | |
|---|---|---|---|
| 3,149,293 | 9/1964 | Farkas | 236/46 F X |
| 3,443,121 | 5/1969 | Weisbrod | 236/46 F X |
| 3,915,377 | 10/1975 | Sutton, Jr. | 236/49 |
| 4,113,175 | 9/1978 | Sutton, Jr. | 236/49 X |
| 4,241,871 | 12/1980 | Newell, III et al. | 236/49 |
| 4,251,026 | 2/1981 | Siegel et al. | 236/49 |

*Primary Examiner*—William E. Tapolcai
*Attorney, Agent, or Firm*—W. Thad Adams, III

[57] ABSTRACT

An energy management apparatus is disclosed for providing temperature responsive ventilation in an animal enclosure (A). An outside temperature sensor 15 cooperates with a cycle timer 21 to operate an output device such as a ventilation fan (10) for a variable percentage of time during consecutive given time intervals. A controller (12) cooperates with the temperature sensor (15) and the cycle timer (21) to automatically vary the percentage of fan (10) operation time during each given time interval in response to temperature changes in the outside air whereby constant minimum ventilation efficiency is maintained within enclosure (A). An indoor temperature sensor (16) can be optionally provided to override the outdoor sensor (15) to ensure that the temperature within the enclosure (A) remains within desired limits.

14 Claims, 4 Drawing Figures

VENTILATION CONTROL APPARATUS FOR ANIMAL ENCLOSURE AND METHOD

TECHNICAL FIELD AND BACKGROUND OF THE INVENTION

This invention relates to a ventilation control apparatus for an animal enclosure, such as a poultry house. The application also describes a method by which ventilation is controlled within any such an animal enclosure.

Proper ventilation in a poultry enclosure results in higher production, better quality, improved feed conversion, less disease and lower mortality rates. Poultry are particularly sensitive to changes in ventilation conditions for a number of reasons. First, all birds have a very high metabolism rate. This results in the rapid build-up of respiration waste products, particularly carbon dioxide. Since carbon dioxide is heavier than the ambient air, the carbon dioxide tends to accumulate from the enclosure surface upwardly. Since poultry have short legs and are therefore close to the floor, the carbon dioxide layer can very rapidly accumulate to a point where the poultry are submerged in a blanket of carbon dioxide. Because of the high respiration and metabolism rates of the poultry, the poultry very quickly suffocate. Even in less extreme cases, too little ventilation creates gas fumes and ammonia which will weaken the birds and increase mortality from secondary causes.

Of course, build-up of carbon dioxide, moisture and gas fumes can be eliminated by constant ventilation. However, too much ventilation drastically decreases productivity by wasting heat and decreasing feed conversion rates. As is apparent, to the extent the poultry must use calories to maintain their body heat, those calories are not available for adding weight. Between the two extremes of no ventilation and too much ventilation, there exists an ideal ventilation rate at which the air exchange is sufficient to remove gases, provide replacement oxygen and remove moisture while maintaining the feed conversion rate by minimizing the number of calories which must be expended by the poultry for maintenance of body temperature.

A properly regulated ventilation system should have the capacity to produce the proper ventilation at any given temperature; automatically adjust the ventilation rate in response to changing outdoor conditions, control moisture, gas and ammonia buildup; properly mix and distribute fresh outside air to maintain a uniform and healthy environment throughout the entire enclosure and reduce the supervision and labor necessary to regulate the proper ventilation rate and temperature. The goal of regulating the ventilation system is to arrive at a minimum ventilation rate and to maintain that rate as the temperature varies during any given day and also as the temperature varies from day to day and week to week during the growth cycle of the poultry. Aside from providing replacement oxygen and removing fumes and toxic gases, removal of moisture is a critical factor in maintaining proper ventilation. The temperature of air greatly affects its ability to hold water. As a general rule, for every 20° F. (11° C.) rise in the dry bulb temperature of air, its ability to hold moisture doubles. Continued reduction in airflow rate will increase the water removal rate until the losses of heat through the ceiling and walls of the animal enclosure prevents further proportionate increases in temperature in the house. At this point, the water removal rate begins to be reduced. Of course, with no airflow, no water can be removed. Therefore, especially in winter, the optimum flow rate for maximum moisture removal varies from day to day depending upon *outdoor* climatic conditions and construction of the animal enclosure. Either too much or too little airflow results in excess moisture. In the summer, the air temperature is usually high enough to have good moisture holding capacity and all that is required is that the air within the animal enclosure be exchanged at an adequate rate to provide for sufficient replacement oxygen and gas removal.

it is also important to maintain a suitable temperature within the animal enclosure which is above the outdoor temperature in winter and is low as is economically feasible in summer. In winter, the ventilation system uses part of the birds' own body heat to warm the incoming air and evaporate and remove moisture. In summer, the ventilation system must remove all of the heat generated by the poultry plus the solar heat which is transmitted into the enclosure through the walls and roof. Therefore, a much larger airflow rate is needed during summer to keep the building temperature within the range of the outdoor temperature. Establishing proper ventilation is accomplished by computing the cubic feet per minute of total airflow necessary to provide the minimum ventilation efficiency discussed above. Using prior art methods and equipment, tables are used which provide information concerning the ventilation required at various ages and outside temperatures to eliminate moisture produced by poultry and to provide sufficient fresh uncontaminated replacement air. The proper ventilation rate is then expressed as a percentage of the total cubic feet per minute of airflow a ventilation system will produce if operating 100% of the time. By determining this figure a timer (usually a ten minute timer) is set so that, for example, if a system has a total airflow capacity of 10,000 cfm (300 cubic meters per minute) and 3,000 cfm (90 cmm) of airflow is computed to be sufficient, the ten minute timer is set to operate the ventilation fans for three minutes during each consecutive ten minute timing cycle. The problem with this approach is that these figures are based on a given outside temperature, for example 70° F. (22° C.). The control unit is then left unattended for a period of one week. Based upon the setting, the ventilation fans operate the same amount of time during each ten minute cycle day and night throughout the entire week. Then, the setting is adjusted to take into account the fact that the birds are one week older, have different oxygen demands and produce larger quantities of carbon dioxide and droppings.

However, this type of setting provides only a crude approximation of ideal conditions. During any given day the outside air temperature can vary 20° F. to 30° F. (11° C. to 16° C.). As mentioned above, the air retaining capacity of air doubles for every 20° F. (11° C.) rise in temperature and, conversely, is reduced by half for each 20° F. (11° C.) drop in temperature. Therefore, the system will be operating at the desired efficiency only for a relatively short period of time during each day even if overall weather conditions remain unchanged simply because of the variation in daytime and nighttime temperatures.

In accordance with the invention described below, an outside air temperature sensor constantly transmits temperature information to an adjustment means. As a result, the percentage of operation time is constantly varied so that the ventilation fans or other output devices vary in operation time to take into account even very slight changes in outside air temperature. This results in a much more efficient ventilation system which minimizes power requirements and optimizes feed conversion rates and poultry mortality.

SUMMARY OF THE INVENTION

Therefore, it is an object of the invention to provide an energy management apparatus for providing temperature responsive ventilation in an animal enclosure.

It is yet another object of the invention to provide an energy management apparatus which automatically varies the percentage of operation time of an output device, such as a ventilation fan, during consecutive given time intervals in response to temperature changes in outside air for maintaining constant minimum ventilation efficiency within an animal enclosure.

It is yet another object of the invention to provide an energy management apparatus which reduces the supervision and labor necessary to properly regulate animal enclosure temperature and ventilation.

It is still another object of the present invention to provide an energy management apparatus which increases feed conversion rates by not overventilating the animal enclosure.

It is a further object of the present invention to provide a method of controlling ventilation in an animal enclosure in order to accomplish the objects set forth above.

These and other objects of the invention are achieved in the preferred embodiments disclosed below by providing an energy management apparatus for providing temperature responsive ventilation in an animal enclosure, which animal enclosure has an electric power supply and at least one temperature control output device such as a ventilation fan, in operative connection with the power supply in order to exchange air in the enclosure.

The energy management apparatus is electrically interposed between the power supply and the output device for controlling the transmission of energy to the output device. According to one embodiment of the invention, the energy management apparatus includes a temperature sensor for sensing the temperature of air outside the enclosure and a cycle timer for operating the output device for a variable percentage of time during consecutive given time intervals. An adjustment mechanism cooperates with the temperature sensor and the cycle timer to automatically vary the percentage of output device operation time during each given time interval in response to temperature changes in the outside air. Therefore, constant minimum ventilation efficiency is maintained within the enclosure.

According to another embodiment of the invention, the energy management apparatus comprises an inside temperature sensor and an override thermostat for actuating the output device if the temperature within the enclosure exceeds a predetermined maximum temperature or falls below a predetermined minimum temperature.

According to various embodiments of the invention, the temperature control output device can comprise one or more ventilation fans, heaters, air conditioners or any combination of these.

According to another embodiment of the invention, the energy management apparatus includes an equipment failure device operatively connected between the power supply and the output device immediately upstream of the output device and adapted to operate the output device in the presence of any equipment failure upstream of the equipment failure device. The equipment failure device includes a relay which is biased for holding the contacts of the relay in normally closed position for output device operation. The relay includes a coil which must be energized to overcome the bias to open the contacts and deenergize the output device. Therefore, failure of any equipment which deenergizes the coil causes the output device to operate and prevents a lack of ventilation within the animal enclosure.

In accordance with the method of the invention, ventilation in an animal enclosure having an electric power supply and at least one temperature control output device is accomplished according to the steps of sensing the temperature of the air outside the animal enclosure, providing means for operating the output device for a variable percentage of time during consecutive given time intervals and varying the percentage of output device operation time during each given time interval in response to temperature changes in the outside air whereby constant minimum ventilation efficiency is maintained within the enclosure. The method according to another embodiment of the invention includes the additional steps of sensing the temperature of the air inside the animal enclosure and actuating the output device if temperature within the enclosure exceeds a predetermined maximum temperature independent of the outside air temperature.

BRIEF DESCRIPTION OF THE DRAWINGS

Some of the objects of the invention have been set forth above. Other objects and advantages of the invention will appear as the description of the invention proceeds when taken in conjunction with the following drawings in which.

DESCRIPTION OF THE PREFERRED EMBODIMENT

Figure 1:
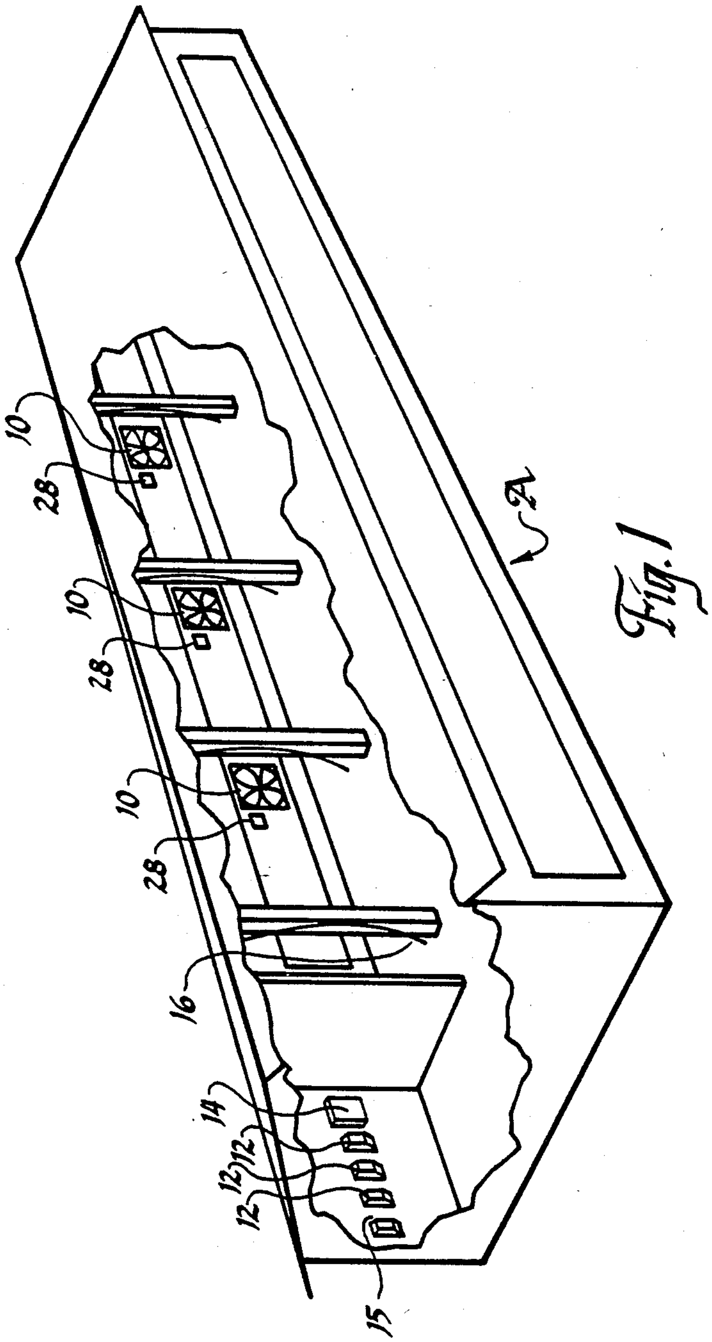
FIG. 1 is a perspective view, with parts broken away of a hypothetical animal enclosure, such as a poultry house, equipped with four apparati according to the present invention.

Referring now specifically to the drawings, an animal enclosure A is shown in FIG. 1. For purposes of this application, it will be assumed that the animal enclosure A is 40 ft. (12.2 m) wide by 300 Ft. (122 m) long and is designed to accomodate 8000 pullets at any one time. It will also be assumed that the pullets are five weeks old and that the base outside temperature is 70° F. (22° C.). Enclosure A is equipped with four ventilation fans 10. Each of these ventilation fans 10 is equipped with an energy management apparatus which for purposes of this application will be referred to as a ventilation controller 12. Several embodiments of ventilation controller 12 will be explained below. Ventilation fan 10 and controllers 12 are energized by suitable 24 volt, 60 Hz. alternating current through a power supply 14.

Figure 2:
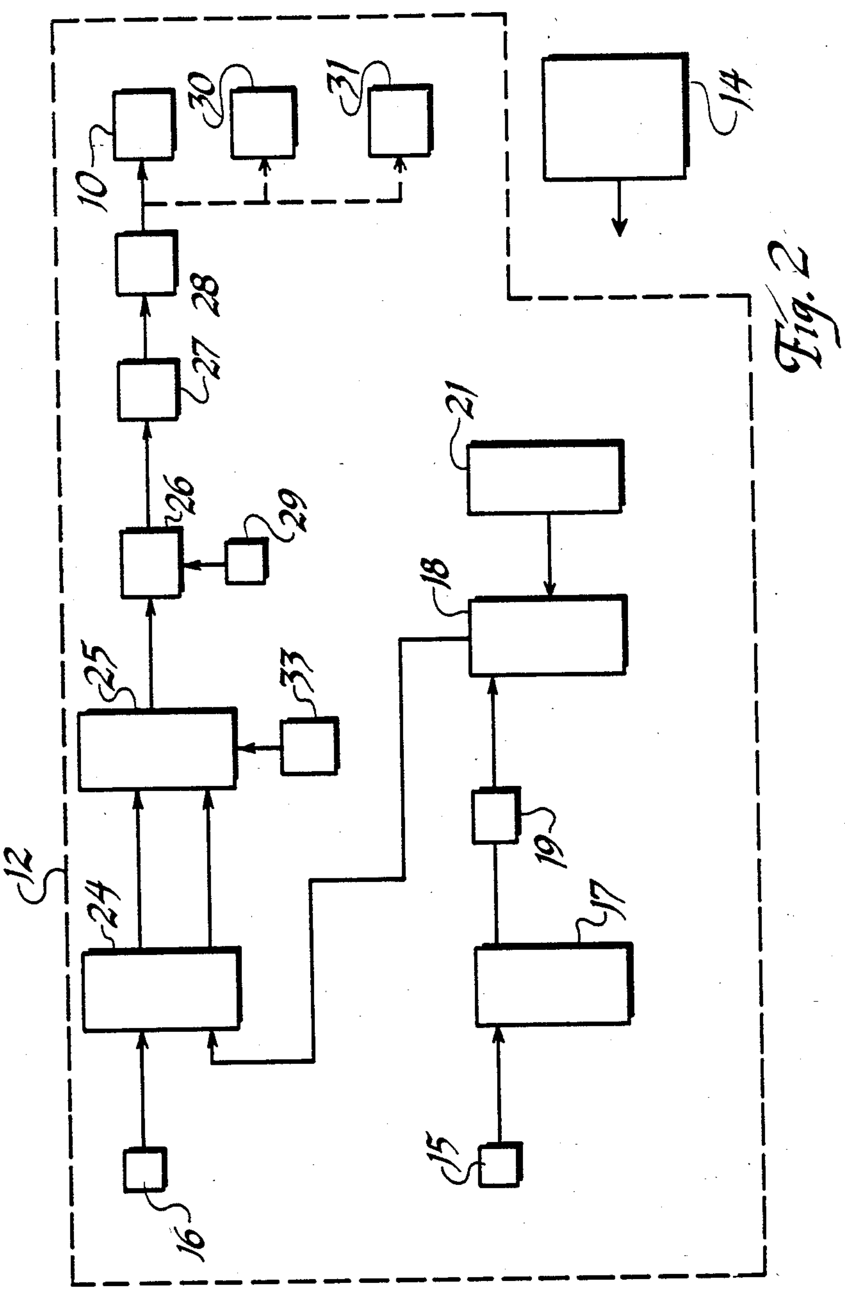
FIG. 2 is a block electrical diagram of one embodiment of the invention.

Referring now to FIG. 2, one of the controllers 12 is shown in block diagram form. Controller 12 preferably includes an outdoor sensor 15 for sensing the temperature of air outside enclosure A and an indoor sensor 16 for sensing temperature within enclosure A. Sensor 15 is connected in phase to an analog amplifier 17 which takes the temperature reading and provides an amplified analog output signal. This signal is transmitted to a percent timer 18. Percent timer 18 operates in cooperation with a timer setting switch 19 which sets a length of time expressed in a percentage of operation time during a given time interval, (for example 20%, or one minute every five minute cycle) and a cycle timer trip 21 which trips percent timer 18 every five minutes and causes the cycle to repeat. Output from the percent timer 18 is transmitted to a programmer circuit 24 which includes eight DIP switches which permits various combinations of output. Indoor sensor 16 also transmits an output signal to programmer circuit 24.

There are two outputs from programmer circuit 24. One output is an "override" output from the indoor sensor 16 so that, according to several embodiments of the invention, should the temperature fall below a certain minimum temperature, exceed a certain maximum temperature or fall outside a range of upper and lower temperatures, a constant signal is transmitted from programmer circuit 24 to an analog converter 25. Analog converter 25 produces a high/low output signal. The other output from programmer circuit 24 is from percent timer 18 and if not overidden by indoor sensor 16, sends a "low" signal when operation of the output device is desired.

The output from analog converter 25 is to a zero crossing switch 26. Zero crossing switch 26 is an integrated circuit which permits current to be passed through the TRIAC 27 beginning at zero crossing on the voltage. Current which is switched on by the TRIAC passes through a relay 28 to a suitable output control device, which may be the fan 10, or, alternatively, a heater 30 and/or an air conditioner 31.

Zero crossing switch 26 monitors AC Signal 29.

As is described above, indoor sensor 16 will activate fan 10 at any time a set temperature is reached. Analog converter 25 is adjusted by means of a temperature regulator 33. Depending upon the manner in which the programmer circuit 24 is set, the temperature sensed by indoor sensor 16 causes fan 10 to come on and stay on until the temperature moves back below the temperature set point established by temperature regulator 33. In contrast, the outdoor sensor 15 is programmed so that it constantly varies the percent of time during each five minute cycle during which fan 10 operates. Ordinarily, the knob on timer setting switch 19 is set for the desired percentage of run time according to the age of the poultry, assuming a base temperature of 70° F. is the outside temperature. As the outside temperature drops, the percentage of time during each five minute cycle during which fan 10 operates will be reduced automatically by reason of the variation in the amplified analog signal from analog amplifier 17.

Previously, timer ventilation has been determined by nighttime temperatures in order to be on the safe side. The charts tend to recommend overventilation instead of underventilation. Using the controller described above, the daytime temperature can be roughly determined and the ventilation rate throughout the entire day and night is automatically corrected for temperature variations. In the examples cited above, assume that the timer setting switch 19 is set to 50%. If the timer setting switch 19 is set to 50%, the run time of fan 10 will be two minutes, thirty seconds every five minutes at 70° F. Should the outside temperature drop to 40° F., the percent timer 18 will automatically be cut by 40% so that the run time is one minute, thirty seconds. At 32° F., the percentage is cut by 60% so that the run time will be one minute. As mentioned above, the indoor sensor 16 is programmed to override the percent timer so that fan 10 operates continuously should the temperature vary beyond established limits.

Figure 3:
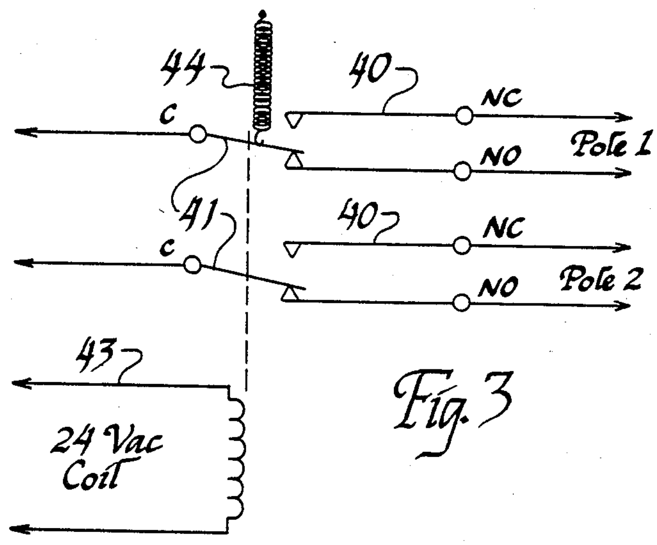
FIG. 3 is a schematic view of the contacts of the relay of the equipment failure device according to the invention in their open position with the coil energized to open the contacts and deenergize the output device.
Figure 4:
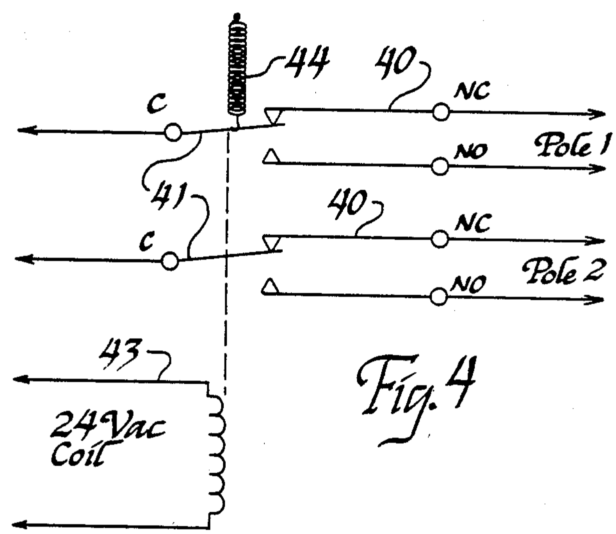
FIG. 4 is a view similar to that in FIG. 3 showing the contacts in their normally closed position for output device operation with the coil deenergized.

According to one embodiment of the invention, the controller 12 can be programmed through programmer circuit 24 to provide "virtually fail safe" ventilator operation. As is shown in FIG. 3, contacts 40 and 41 are held in open position by energization of a coil 43 against the normally closed biasing action of a spring 44. In the position shown in FIG. 3, the fan 10 or other output device is not in operation. To operate fan 10, coil 43 must first be deenergized at which time contact 41 moves upwardly into engagement with contact 40 under the urging of spring 44 as is shown in FIG. 4. When contacts 40 and 41 are closed, fan 10 is energized and provides ventilation to animal enclosure A. The advantage in this system is that should any of the components downstream of relay 28 fail causing coil 43 to deenergize, the contacts 40 and 41 are closed and ventilation is provided. This mode is especially useful for minimum ventilation fans such as timer fans and/or fans set at the lowest temperature settings. In addition, where separate sets of first stage and second stage fans 10 are provided, the relay can be set to have a second stage fan transformer monitor power on the first stage fans 10. If the breaker on the first stage fans fail, the second stage fans operate.

As described above, many different combinations of output devices can be used. Ordinarily, ventilation fans in combination with the body heat given off by the poultry are sufficient to maintain temperature within desired ranges during moderate weather. In extremely warm climates, additional cooling capacity can be provided by means of air conditioners 31.

In extremely cold climates, additional heat can be provided in the same manner by programming programmer circuit 24 to switch auxiliary heaters 30 on when indoor sensor indicates a below minimum temperature.

Controller 12 can be programmed to function in six different ways:

1. relay 28 is energized either by percent timer 18 or a predetermined high temperature sensed by indoor sensor 16;
2. relay 28 is energized by percent timer 18 and/or a predetermined low temperature sensed by indoor sensor 16;
3. relay 28 is deenergized either by percent timer 18 or a predetermined high temperature from indoor sensor 16;
4. relay 28 is deenergized by percent timer 18 and/or a predetermined low temperature sensed by indoor sensor 16;
5. percent timer 18 begins cycling when cooling is called for to conserve energy by operating only during a given percent of each five minute cycle; or
6. percent timer 18 begins cycling when heating is called for to likewise conserve energy.

Controller 12 as described above operates in order to provide ventilation control throughout an entire week or any other predetermined period of time. Ordinarily, the operator will calculate a revised minimum efficiency ventilation rate each week based on the increasing age of the poultry and their increased oxygen demand and droppings output which is high in moisture. The proper percentage of total ventilation capacity is set on percent timer 18 and, for the next week, the outside temperature sensor 15 automatically varies the percentage of time fan 10 operates.

The information required to make the appropriate weekly calculations of necessary ventilation is readily available from, for example, American Coolair Corporation of Jacksonville, Fla. (Form 180).

An energy management apparatus and method is described above. Various details of the invention may be changed without departing from its scope. Furthermore, the foregoing description of the preferred embodiment according to the present invention is provided for the purpose of illustration and not for the purpose of limitation-the invention being defined by the claims.

I claim:

1. An energy management apparatus for providing temperature responsive ventilation in an animal enclosure, said animal enclosure having electric power supply means and at least one temperature control output device in operative connection with said power supply means for exchanging air in the enclosure, said apparatus being electrically interposed between said power supply means and said output device for controlling the transmission of electricity to said output device, said energy management apparatus comprising:

a. a temperature sensor for sensing the temperature of air outside the enclosure;

b. a cycle timer for operating the output device for a variable percentage of time during consecutive given time intervals; and c. adjustment means cooperating with said temperature sensor and said cycle timer to automatically vary the percentage of output device operation time during each given time interval in response to temperature changes in the outside air whereby constant minimum ventilation efficiency is maintained within the enclosure.

2. An energy management apparatus according to claim 1 and and including;

d. an inside temperature sensor operating as an override thermostat for actuating said output device if the temperature within the enclosure exceeds a predetermined maximum temperature, whereby the temperature is lowered to below the maximum temperature inside the enclosure independent of the operation of said outside temperature sensor, cycle timer and adjustment means.

3. An energy management apparatus according to claim 1 or 2, wherein said temperature control output device comprises a ventilation fan.

4. An energy management apparatus according to claim 1, wherein said temperature control output device comprises a heater.

5. An energy management apparatus according to claim 1 or 2, wherein said temperature control output device comprises an air conditioner.

6. An energy management apparatus according to claim 1 or 2 and including equipment failure means operatively connected between said power supply means and said output device immediately upstream of said output device and adapted to operate said output device in the presence of any equipment failure upstream of said equipment failure means, said equipment failure means comprising a relay having biasing means for holding the contacts of said relay in normally closed position for output device operation and having a coil which must be energized to overcome the biasing means to open the contacts and deenergize said output device, whereby failure of any equipment which deenergizes said coil causes said output device to operate and prevents a lack of ventilation within the animal enclosure.

7. An energy management apparatus according to claim 6, wherein said relay comprises a double throw, double pole relay.

8. An energy management apparatus for providing temperature responsive ventilation in an animal enclosure, said animal enclosure having electric power supply means and at least one temperature control output device in operative connection with said power supply means for exchanging air in the enclosure, said apparatus being electrically interposed between said power supply means and said output device for controlling the transmission of electricity to said output device, said energy management apparatus comprising;

a. a temperature sensor for sensing the temperature of air outside the enclosure;

b. a cycle timer for operating the output device for a variable percentage of time during consecutive given time intervals;

c. adjustment means cooperating with said temperature sensor and said cycle timer to automatically vary the percentage of output device operation time during each given time interval in response to temperature changes in the outside air whereby constant minimum ventilation efficiency is maintained within the enclosure.

d. an inside temperature sensor operating as an override thermostat for actuating said output device if the temperature within the enclosure moves outside a predetermined temperature range, whereby the temperature inside the animal enclosure is maintained within the temperature range independent of the operation of said outside temperature sensor, cycle timer and adjustment means.

9. An energy management apparatus according to claim 8 and including means for actuating said timer only when the temperature within the animal enclosure exceeds a predetermined maximum temperature.

10. An energy management apparatus according to claim 8, wherein said timer includes means for being actuated only when the temperature falls below a given minimum temperature within the animal enclosure.

11. A method of controlling ventilation in an animal enclosure having electric power supply means and at least one temperature control output device, said method comprising the step of:

a. sensing the temperature of air outside the animal enclosure;

b. providing means for operating the output device for a variable percentage of time during consecutive given time intervals; and c. varying the percentage of output device operation time during each given time interval in response to temperature changes in the outside air whereby constant minimum ventilation efficiency is maintained within the enclosure.

12. A method according to claim 11 and including the additional steps of:

d. sensing the temperature of air inside the animal enclosure; and e. actuating said output device if temperature within the enclosure exceeds a predetermined maximum temperature independent of the outside air temperature.

13. A method according to claim 11 and including the additional steps of:

f. sensing the temperature of the air inside the animal enclosure; and g. actuating the output device if the temperature within the enclosure moves outside a predetermined temperature range whereby the inside temperature is maintained within the temperature range independent of the outside air temperature.

14. A method according to claim 11 and including the steps of:

h. providing relay means between said power supply means and said output device;

i. biasing said relay means in a normally closed position for output device operation and energizing said relay to overcome the biasing and deenergize the output device, whereby failure of any equipment which deenergizes the relay causes the output device to operate and prevents a lack of ventilation within the animal enclosure.

* * * * *